Figure 1:
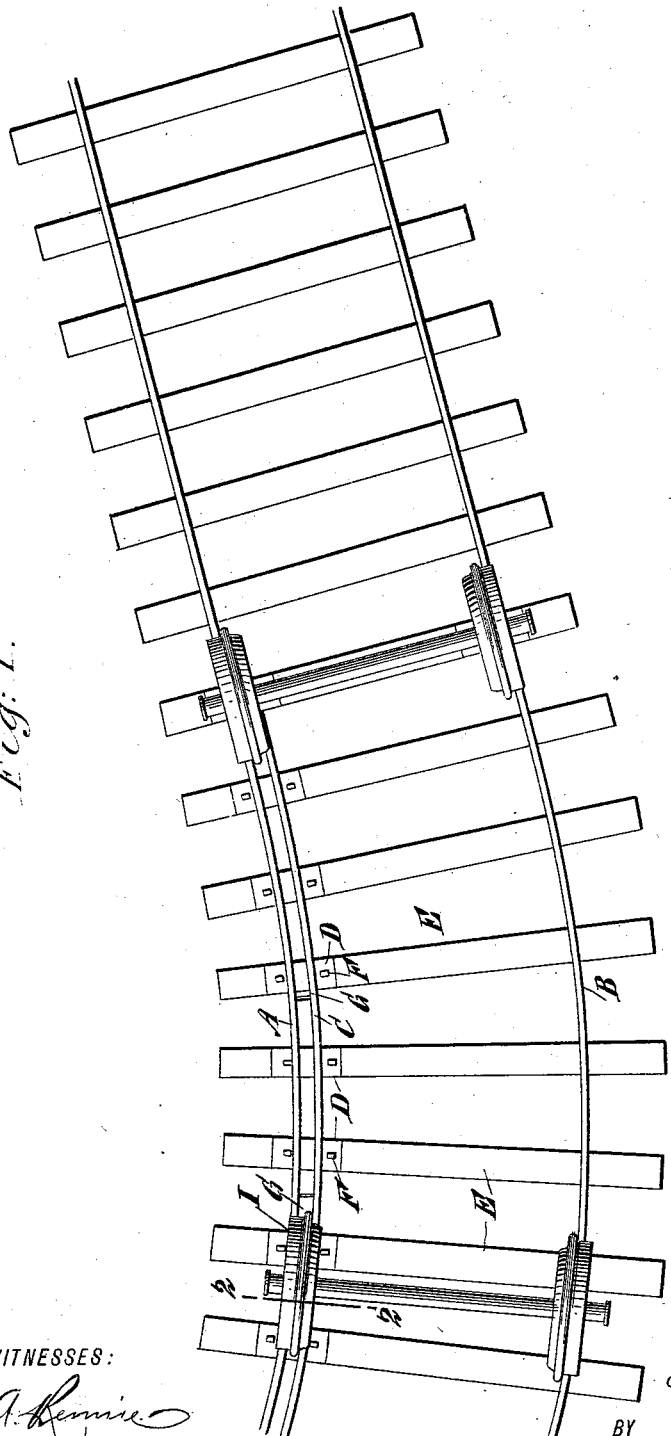

(No Model.)
2 Sheets—Sheet 1.

C. W. FLINT.
CAR WHEEL AND TRACK.

No. 556,624. Patented Mar. 17, 1896.

WITNESSES:

INVENTOR

BY

ATTORNEY.

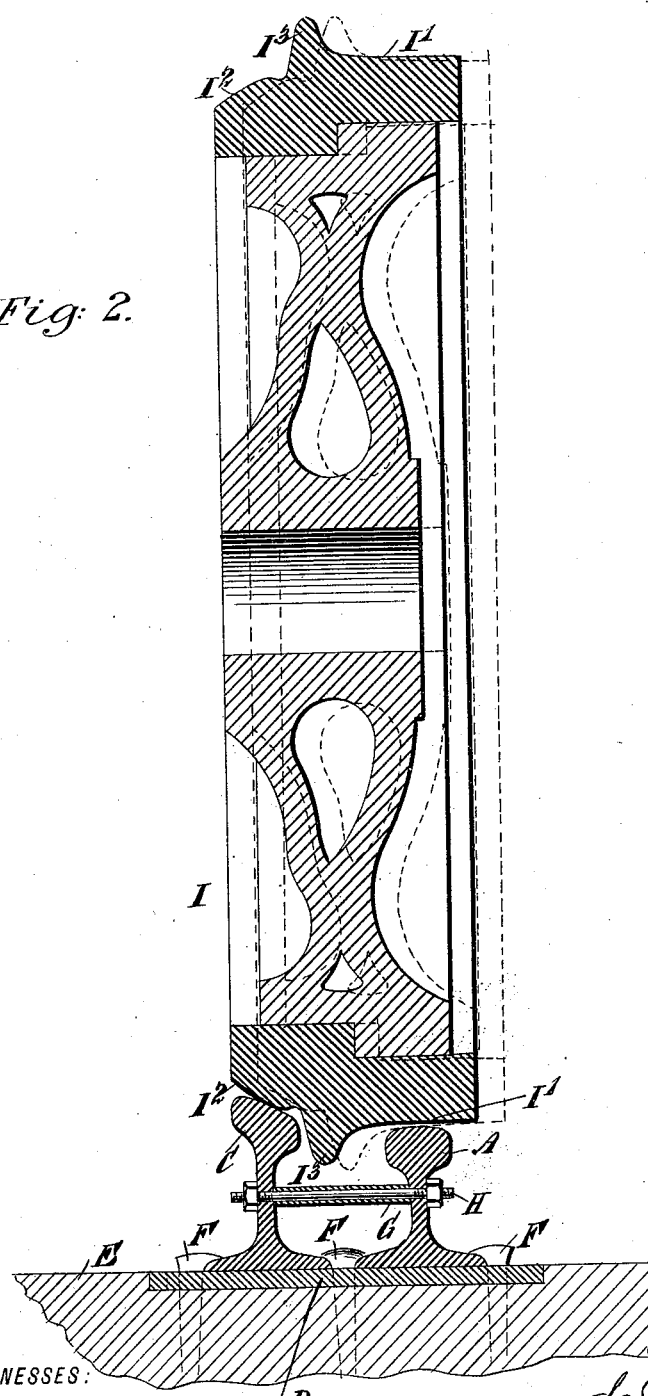

United States Patent Office.

CHRISTIAN WALDEMAR FLINT, OF PORT TOWNSEND, WASHINGTON.

CAR WHEEL AND TRACK.

SPECIFICATION forming part of Letters Patent No. 556,624, dated March 17, 1896.

Application filed December 12, 1895. Serial No. 571,888. (No model.)

*To all whom it may concern:*

Be it known that I, CHRISTIAN WALDEMAR FLINT, of Port Townsend, in the county of Jefferson and State of Washington, have invented certain new and useful Improvements in Car Wheels and Tracks, of which the following is a full, clear, and exact description.

The object of the invention is to provide certain new and useful improvements in car and locomotive wheels and tracks whereby a train can be run with great speed and ease over curves without danger of derailing and without inclining the tracks as now practiced.

The invention consists principally of a wheel having two treads of different diameters and with a dividing-flange between the treads and an inner main curved rail and a leading-rail arranged inside of said curved rail to permit the wheel to shift from one rail to the other upon rounding the curve.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in both the figures.

Figure 1 is a plan view of the track with the wheels in position, and Fig. 2 is an enlarged transverse section of one of the wheels and the track on the line 2 2 in Fig. 1.

As illustrated in Fig. 1, the railroad-track at the curve is provided with an inner curved rail, A, and an outer curved rail, B, with a leading-rail C inside of and adjacent to the inner curved rail, A. The two rails A and C are held on bed-plates D, resting on the railroad-ties E, said bed-plates and rails being secured and fastened in place by the usual spikes F, as indicated in Fig. 2. The rails A and C are held a suitable distance apart, and in order to maintain this distance I employ a tie G, held by a bolt H, connecting the webs of the two rails with each other, with the tie G abutting against the adjacent faces of the webs of the two rails. (See Fig. 2.)

The car or locomotive wheel I, adapted to travel on the track-rails, is provided with two treads I' and I$^2$, separated from each other by a flange I$^3$, adapted to enter the space between the heads of the two rails A and C.

The two treads I' and I$^2$ are of different diameters—that is, the tread I$^2$ is somewhat less in diameter than the tread I' and is beveled, as plainly indicated in Fig. 2. The head of the rail C is likewise beveled to correspond to the bevel of the tread I$^2$—that is, the rail-head is highest toward the center of the track. Now it will be seen that when a car or locomotive passes upon the curve then the inner wheel passes with its tread I$^2$ upon the leading-rail C, so that the tread I' leaves the head of the rail A and the wheel turns with the tread I$^2$ on the head of the rail C. Now it will be seen that owing to the curve the wheels on the axle tend to travel outwardly, so as to cause the tread I$^2$ of the inner wheel I to pass upon and creep up the rail C. This lateral movement of the wheel is according to the radius of the curve and the speed of the car. Thus the shorter the curve the more lateral movement the wheels will have. As the tread I$^2$ of the inner wheel is considerably less than the tread of the outer wheel traveling on the rail B, it follows that the two wheels on the same axle will run in unison around the curve on the rails C and B.

It is understood that the gage of the rails on the curve is about one-half an inch wider than that on a straight line of track, so as to prevent the flange of the outer wheel from making frictional contact with the head of the rail B.

It will be seen that by the arrangement described the two rails A C form the web, which always stands and remains in a true sweep and is not liable to warp, as is so frequently the case with inner-curve rails as now constructed.

Having thus fully described my invention, I claim as new and desire to secure by Letters Patent—

1. A railway having two rails held adjacent to each other, one rail having its tread elevated above the tread of the remaining rail, said elevated tread being beveled downward and toward the remaining rail, substantially as described.

2. The combination of two rails, arranged alongside of each other and with a space between them, one rail having its tread raised above the tread of the remaining rail and the said tread being beveled toward the said remaining rail, and a wheel having two treads one of which is of a size reduced over that of the remaining tread and being beveled inward toward the axis of the wheel, the wheel having a peripheral flange dividing the treads and the wheel being capable of movement transversely with relation to the rails whereby the treads of the wheel are alternately engaged with their respective rails, substantially as described.

3. The combination of rails extended alongside each other, and a wheel, the wheel having two treads, one of which is of a diameter increased over the diameter of the remaining tread and the wheel being capable of transverse movement with relation to the rails by which movement the treads may be alternately engaged with their respective rails, the treads being incapable of simultaneous engagement with the rails, substantially as described.

4. A car-wheel having two treads, one of which is of a diameter increased over the diameter of the remaining tread, the tread being beveled inwardly with relation to the axis of the wheel, substantially as described.

5. A car-wheel having two treads, one of which is of a diameter increased over the diameter of the remaining tread, the inner tread being beveled inwardly with relation to the axis of the wheel, and a circumferential flange dividing the two treads, substantially as described.

CHRISTIAN WALDEMAR FLINT.

Witnesses:
HANS C. MILLER,
GEORGE T. O. PINK.